United States Patent
Joseph et al.

(10) Patent No.: US 10,652,815 B2
(45) Date of Patent: May 12, 2020

(54) TECHNIQUES AND APPARATUSES FOR NETWORK ACCESS VIA A HYBRID CELL ASSOCIATED WITH A SHARED PUBLIC LAND MOBILE NETWORK IDENTITY

(71) Applicant: QUALCOMM Incorporated, San Diego, CA (US)

(72) Inventors: Vinay Joseph, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/030,515

(22) Filed: Jul. 9, 2018

(65) Prior Publication Data

US 2019/0021051 A1 Jan. 17, 2019

Related U.S. Application Data

(60) Provisional application No. 62/531,303, filed on Jul. 11, 2017.

(51) Int. Cl.
*H04W 48/20* (2009.01)
*H04W 48/02* (2009.01)
(Continued)

(52) U.S. Cl.
CPC .......... *H04W 48/20* (2013.01); *H04W 8/186* (2013.01); *H04W 48/02* (2013.01); *H04W 8/183* (2013.01);
(Continued)

(58) Field of Classification Search
CPC ..... H04W 48/20; H04W 8/186; H04W 48/02; H04W 48/12; H04W 48/16; H04W 8/183; H04W 84/045
See application file for complete search history.

(56) References Cited

U.S. PATENT DOCUMENTS

2009/0305699 A1* 12/2009 Deshpande .......... H04W 48/02
455/434
2012/0135738 A1* 5/2012 Yoshihara ............. H04W 48/18
455/436

(Continued)

OTHER PUBLICATIONS

3GPP TS 36.300 V13.8.0 (Jun. 2017) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13) (Year: 2017).*

(Continued)

*Primary Examiner* — Chi H Pham
*Assistant Examiner* — Weibin Huang
(74) *Attorney, Agent, or Firm* — Harrity & Harrity, LLP

(57) ABSTRACT

Certain aspects of the present disclosure generally relate to wireless communication. In some aspects, a user equipment may receive a network identifier of a cell; determine that the cell is a first type of cell; and perform an access procedure to attempt to connect to the cell, wherein a first type of access procedure associated with the first type of cell or a second type of access procedure associated with a second type of cell is performed based at least in part on whether the network identifier indicates a particular type of access procedure. Numerous other aspects are provided.

30 Claims, 9 Drawing Sheets

(51) Int. Cl.
*H04W 8/18* (2009.01)
*H04W 48/12* (2009.01)
*H04W 48/16* (2009.01)
*H04W 84/04* (2009.01)

(52) U.S. Cl.
CPC ............ *H04W 48/12* (2013.01); *H04W 48/16* (2013.01); *H04W 84/045* (2013.01)

(56) References Cited

U.S. PATENT DOCUMENTS

| | | | | |
|---|---|---|---|---|
| 2013/0003699 | A1* | 1/2013 | Liu | H04W 8/082 370/331 |
| 2014/0071941 | A1* | 3/2014 | Sadek | H04W 8/26 370/331 |
| 2015/0208377 | A1* | 7/2015 | Han | H04W 36/32 455/437 |
| 2019/0132066 | A1* | 5/2019 | Park | H04W 36/0094 |

OTHER PUBLICATIONS

Huawei Deutsche Telekom: "Introduction of hybrid cell", 3GPP Draft; R2-094478, 3rd Generation Partnership Project (3GPP), Mobile Competence Centre; 658, Route Des Lucioles; F-06921, Sophia-Antipolis Cedex; France, No. Shenzhen. China; 20090817, Aug. 17, 2009 (Aug. 17, 2009), XP858352636, 6 pages, [retrieved on Aug. 17, 2009].

International Search Report and Written Opinion—PCT/US2018/041475—ISA/EPO—Sep. 27, 2018.

Rapporteur (Nokia Corporation): "Not 73#40: UMTS/LTE: CSG Handling—Discussion Document", 3GPP Draft; R2-111951, Email Discussion Report on CSGS, 3rd Generation Partnership Project (3GPP), Mobile Competence Centre; 650, Route Des Lucioles; F-06921, Sophia-Antipolis Cedex ; France, vol. RAN WG2, No. Shanghai; 20110401, Apr. 5, 2011 (Apr. 5, 2011), XP050605739, 14 pages, [retrieved on Apr. 5, 2011].

"Universal Mobile Telecommunications System (UMTS); LTE; Network sharing; Architecture and functional description (3GPP TS 23.251 version 14.0.0 Release 14)", ETSI Technical Specification, European Telecommunications Standards Institute (ETSI), 650, Route Des Lucioles; F-06921 Sophia-Antipolis Cedex; France, vol. 3GPP SA, No. V14.0.0, May 12, 2017 (May 12, 2017), pp. 1-41, XP014291321, Retrieved from the Internet: URL: http://www.etsi.org/deliver/etsi_ts/123200-123299/123251/14.00.00_60/ts_123251v140000p.pdf , [retrieved on May 12, 2017].

Vodafone., et al., "Introduction of Hybrid cells", 3GPP Draft; R2-096541, 3rd Generation Partnership Project (3GPP), Mobile Competence Centre; 858, Route Des Lucioles; F-06921 Sophia-Antipolis Cedex; France, No. Jeju; 20091109, Nov. 9, 2009 (Nov. 9, 2009), 6 pages, XP050391119, [retrieved on Nov. 2, 2009].

* cited by examiner

TECHNIQUES AND APPARATUSES FOR NETWORK ACCESS VIA A HYBRID CELL ASSOCIATED WITH A SHARED PUBLIC LAND MOBILE NETWORK IDENTITY

CROSS-REFERENCE TO RELATED APPLICATIONS UNDER 35 U.S.C. § 119

This application claims priority to U.S. Provisional Patent Application No. 62/531,303, filed on Jul. 11, 2017, entitled "TECHNIQUES AND APPARATUSES FOR NETWORK ACCESS VIA A HYBRID CELL ASSOCIATED WITH A SHARED PUBLIC LAND MOBILE NETWORK IDENTITY," which is hereby expressly incorporated by reference herein.

FIELD OF THE DISCLOSURE

Aspects of the present disclosure generally relate to wireless communication, and more particularly to techniques and apparatuses for network access via a hybrid cell associated with a shared public land mobile network (PLMN) identity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include identifying a cell associated with a network having a particular network identifier, wherein the cell is configured as a first type of cell with regard to a closed subscriber group (CSG) configuration of the cell; and selectively performing an access procedure associated with the first type of cell or a second type of cell with regard to the CSG configuration, wherein the access procedure is selectively performed based at least in part on whether the particular network identifier matches information stored by the user equipment for a subscription associated with the user equipment, wherein the access procedure is performed to access the network via the cell based at least in part on the subscription.

In some aspects, a user equipment for wireless communication may include one or more processors configured to identify a cell associated with a network having a particular network identifier, wherein the cell is configured as a first type of cell with regard to a CSG configuration of the cell; and selectively perform an access procedure associated with the first type of cell or a second type of cell with regard to the CSG configuration, wherein the access procedure is selectively performed based at least in part on whether the particular network identifier matches information stored by the user equipment for a subscription associated with the user equipment, wherein the access procedure is performed to access the network via the cell based at least in part on the subscription.

In some aspects, a non-transitory computer-readable medium may store one or more instructions for wireless communication. The one or more instructions, when executed by one or more processors of a user equipment, may cause the one or more processors to identify a cell associated with a network having a particular network identifier, wherein the cell is configured as a first type of cell with regard to a CSG configuration of the cell; and selectively perform an access procedure associated with the first type of cell or a second type of cell with regard to the CSG configuration, wherein the access procedure is selectively performed based at least in part on whether the particular network identifier matches information stored by the user equipment for a subscription associated with the user equipment, wherein the access procedure is performed to access the network via the cell based at least in part on the subscription.

In some aspects, an apparatus for wireless communication may include means for identifying a cell associated with a network having a particular network identifier, wherein the cell is configured as a first type of cell with regard to a CSG configuration of the cell; and means for selectively performing an access procedure associated with the first type of cell or a second type of cell with regard to the CSG configuration, wherein the access procedure is selectively performed based at least in part on whether the particular network identifier matches information stored by the user equipment for a subscription associated with the user equipment, wherein the access procedure is performed to access the network via the cell based at least in part on the subscription.

In some aspects, a method of wireless communication, performed by a user equipment (UE), may include receiving a network identifier of a cell; determining that the cell is a first type of cell; and performing an access procedure to attempt to connect to the cell, wherein a first type of access procedure associated with the first type of cell or a second type of access procedure associated with a second type of cell is performed based at least in part on whether the network identifier indicates a particular type of access procedure.

In some aspects, a UE for wireless communication may include memory and one or more processors operatively coupled to the memory. The memory and the one or more processors may be configured to receive a network identifier of a cell; determine that the cell is a first type of cell; and perform an access procedure to attempt to connect to the cell, wherein a first type of access procedure associated with the first type of cell or a second type of access procedure associated with a second type of cell is performed based at least in part on whether the network identifier indicates a particular type of access procedure.

In some aspects, a non-transitory computer-readable medium may store one or more instructions for wireless communication. The one or more instructions, when executed by one or more processors of a UE, may cause the one or more processors to receive a network identifier of a cell; determine that the cell is a first type of cell; and perform an access procedure to attempt to connect to the cell, wherein a first type of access procedure associated with the first type of cell or a second type of access procedure associated with a second type of cell is performed based at least in part on whether the network identifier indicates a particular type of access procedure.

In some aspects, an apparatus for wireless communication may include means for receiving a network identifier of a cell; means for determining that the cell is a first type of cell; and means for performing an access procedure to attempt to connect to the cell, wherein a first type of access procedure associated with the first type of cell or a second type of access procedure associated with a second type of cell is performed based at least in part on whether the network identifier indicates a particular type of access procedure.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
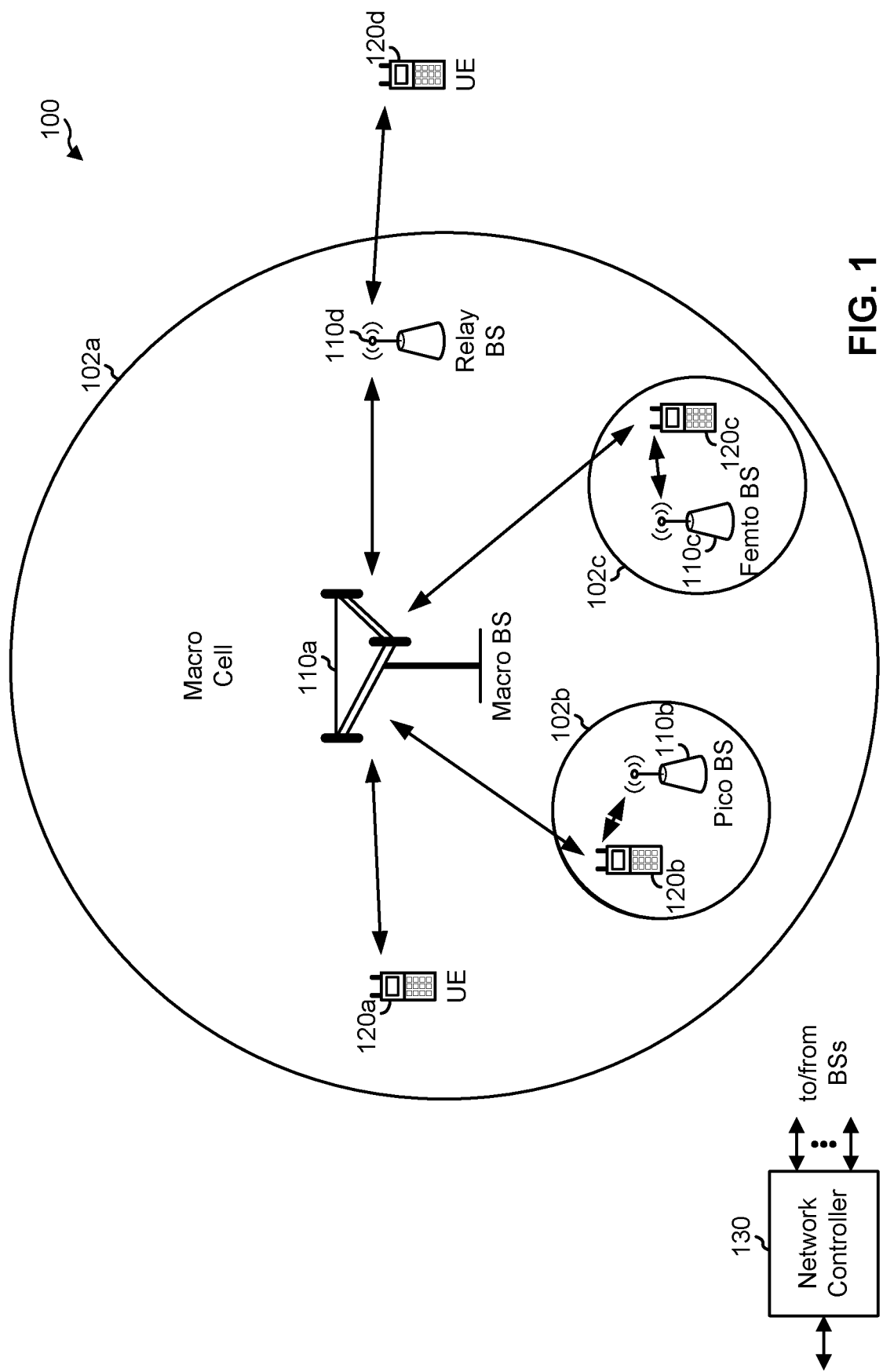
FIG. 1 is a block diagram conceptually illustrating an example of a wireless communication network, in accordance with certain aspects of the present disclosure.

A network, such as a network including an evolved packet core (EPC) and a RAN connected to the EPC, may be identified using a network identifier, such as a PLMN identity. A PLMN identity may correspond to an administration, a mobile network operator (MNO), a collective of MNOs, and/or the like. A UE may store subscription information identifying at least one PLMN identity to which the UE is subscribed, and may access a network when the UE detects a cell having one of the at least one PLMN identity. Thus, a UE may connect to a network that the UE is permitted to access according to a subscription associated with the UE. Some PLMN identities are shared among multiple networks. For example, a neutral host network indicator (NHN-I) of networks associated with the Citizens Broadband Radio Service (CBRS) Alliance is a PLMN identity that may be shared among networks and/or cells that are parties to the CBRS Alliance.

In some aspects, cells in a network may be associated with a closed subscriber group (CSG). A CSG may restrict access to the cells in the network to a predefined list of UEs or subscribers belonging to the CSG. A network associated with a CSG subscription may have a separate network identifier in addition to the PLMN identity. For example, the separate network identifier may include a CSG identifier, which is sometimes termed a csg-Identity. In some aspects, a UE may store information identifying CSG identifiers for networks to which the UE is configured or permitted to connect. In some aspects, the information identifying the CSG identifiers may be termed a CSG list.

A cell of a network that uses a shared PLMN identity may be configured as a first type of cell or a second type of cell with regard to a CSG configuration of the cell. The first type of cell may be termed a hybrid cell, and the second type of cell may be termed a closed cell and/or a CSG cell. A hybrid cell may transmit a CSG indicator that is set to a false value, indicating that the hybrid cell is not a closed cell, but may still transmit a CSG identifier (e.g., in system information, such as a system information block 1 (SIB1)), thereby operating as a "hybrid" cell with both open and closed cell characteristics. On the other hand, a CSG cell may transmit a CSG indicator that is set to a true value, indicating that the CSG cell is a closed cell, and may accordingly transmit a CSG identifier. A hybrid cell configuration may be useful for a cell when the cell is shared with a 3GPP MNO's core network (e.g., evolved packet core (EPC)) using a multi-operator core network (MOCN)-based RAN sharing configuration, since the closed cell configuration allows the hybrid cell to restrict a subscriber from accessing the RAN when needed.

When a UE identifies a closed cell or a CSG cell (e.g., by detecting the CSG indicator set to the true value), the UE may perform an access procedure. The access procedure may include the UE attempting to access a network via the CSG cell when the PLMN identity of the network and the CSG identifier of the cell are included in the subscription information stored by the UE (e.g., a CSG list and/or information identifying PLMN identities associated with the UE). In some cases, the access procedure carried out by a UE for a CSG cell may include a determination, by the UE, that the UE is not permitted to access the cell (e.g., when the CSG identifier and/or the PLMN identifier are not stored by the UE).

On the other hand, when a UE identifies a hybrid cell with a PLMN identity associated with a subscription of the UE, the UE may attempt to connect to the hybrid cell irrespective of whether a CSG identity of the hybrid cell is included in the subscription information stored by the UE. When the UE is not part of the CSG associated with the hybrid cell and the PLMN identity is a shared PLMN identity, the connection attempt may fail in the core network connected to the cell (e.g., based at least in part on authentication of the UE being unsuccessful since the UE does not have a valid subscription to authenticate with the core network). This may be problematic for cells with shared PLMN identities, and may lead to overloading of the network due to multiple UEs attempting to connect to hybrid cells using a shared PLMN identity but failing to connect due to not having a valid CSG subscription to the hybrid cell.

Some techniques and apparatuses, described herein, identify a hybrid cell associated with a particular network identifier (e.g., a shared network identifier or a shared PLMN identity) and selectively perform an access procedure associated with one of a hybrid cell or a CSG cell based at least in part on whether the particular network identifier is included in information stored by the UE. For example, the stored information may include information identifying shared network identifiers, and the UE may perform a CSG cell access procedure when the particular network identifier is one of the shared network identifiers in the stored information. Thus, the UE may reduce unsuccessful connection attempts to hybrid cells that have shared PLMN identities and improve operations of the network.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts). Wireless network 100 may be associated with a network identifier, such as a PLMN identity. BS 110 may broadcast or advertise the network identifier to UE 120, and UE 120 may access wireless network 110 based at least in part on the network identifier.

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
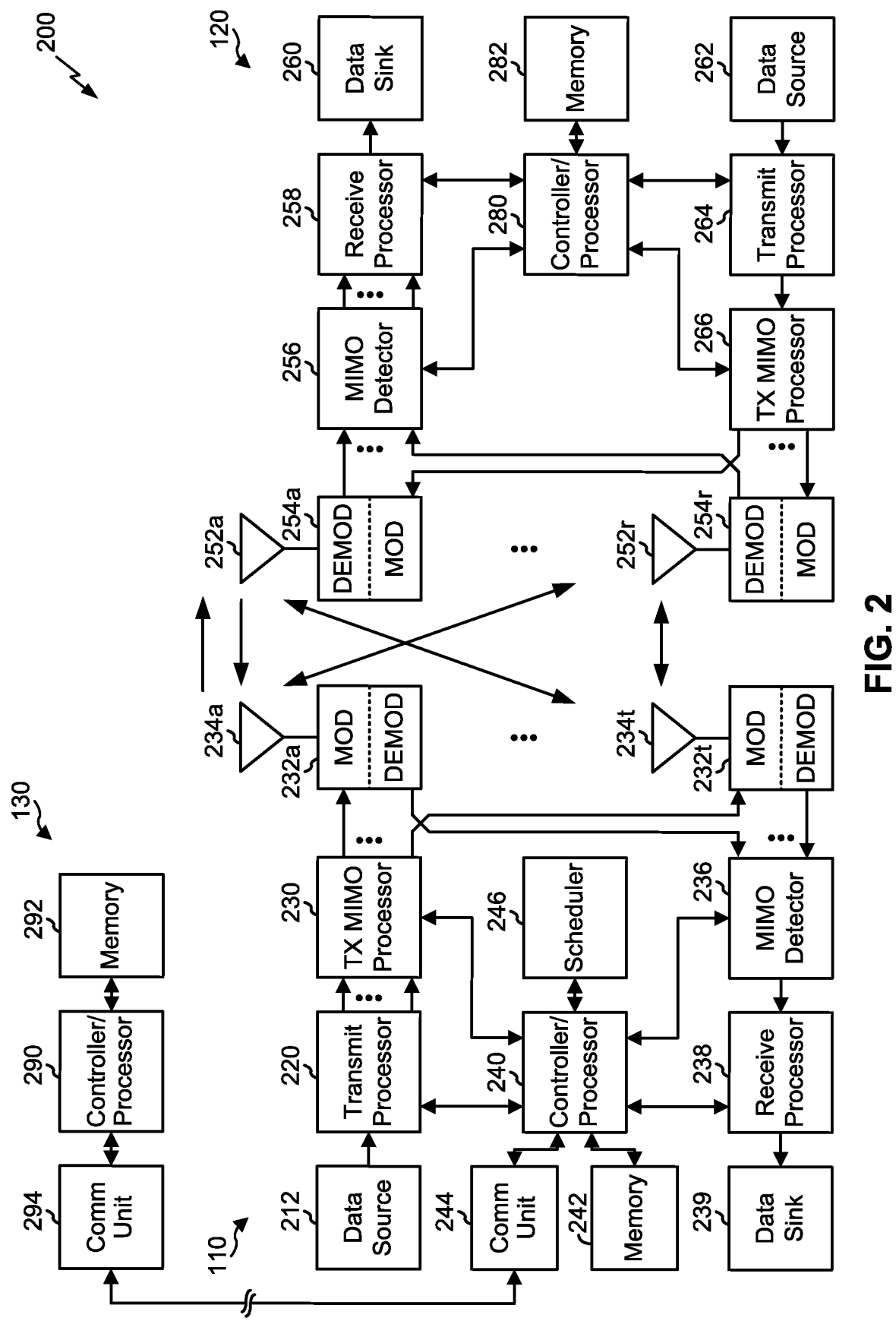
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244.

Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform network access via a hybrid cell associated with a shared PLMN identity. For example, controller/processor 280 and/or other processors and modules at UE 120, may perform or direct operations of UE 120 to perform network access via a hybrid cell associated with a shared PLMN identity. For example, controller/processor 280 and/or other controllers/processors and modules at UE 120 may perform or direct operations of, for example, process 800 of FIG. 8, process 900 of FIG. 9, and/or other processes as described herein. In some aspects, one or more of the components shown in FIG. 2 may be employed to perform example process 800, example process 900, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for receiving a network identifier of a cell; means for determining that the cell is a first type of cell; means for performing an access procedure to attempt to connect to the cell, wherein a first type of access procedure associated with the first type of cell or a second type of access procedure associated with a second type of cell is performed based at least in part on whether the network identifier indicates a particular type of access procedure; and/or the like. In some aspects, such means may include one or more components of UE 120 described above in connection with FIG. 2.

As indicated above, FIG. 2 is provided merely as an example. Other examples are possible and may differ from what was described with regard to FIG. 2.

Figure 3:
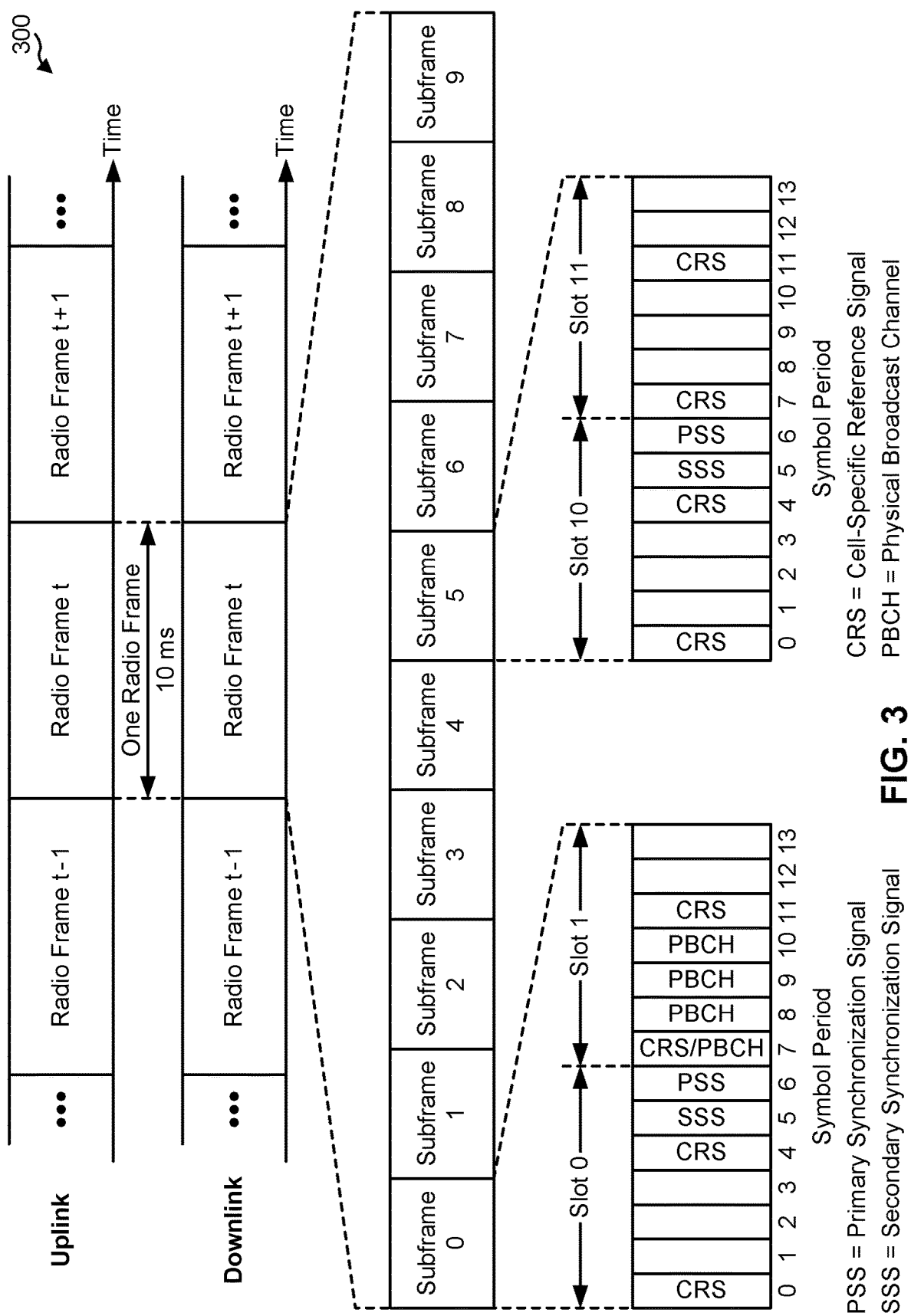
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. For example, the BS may transmit SIB1, which may identify one or more network identifiers (e.g., a PLMN identity, a CSG identifier, etc.) of the BS, a CSG configuration of the BS, and/or the like. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
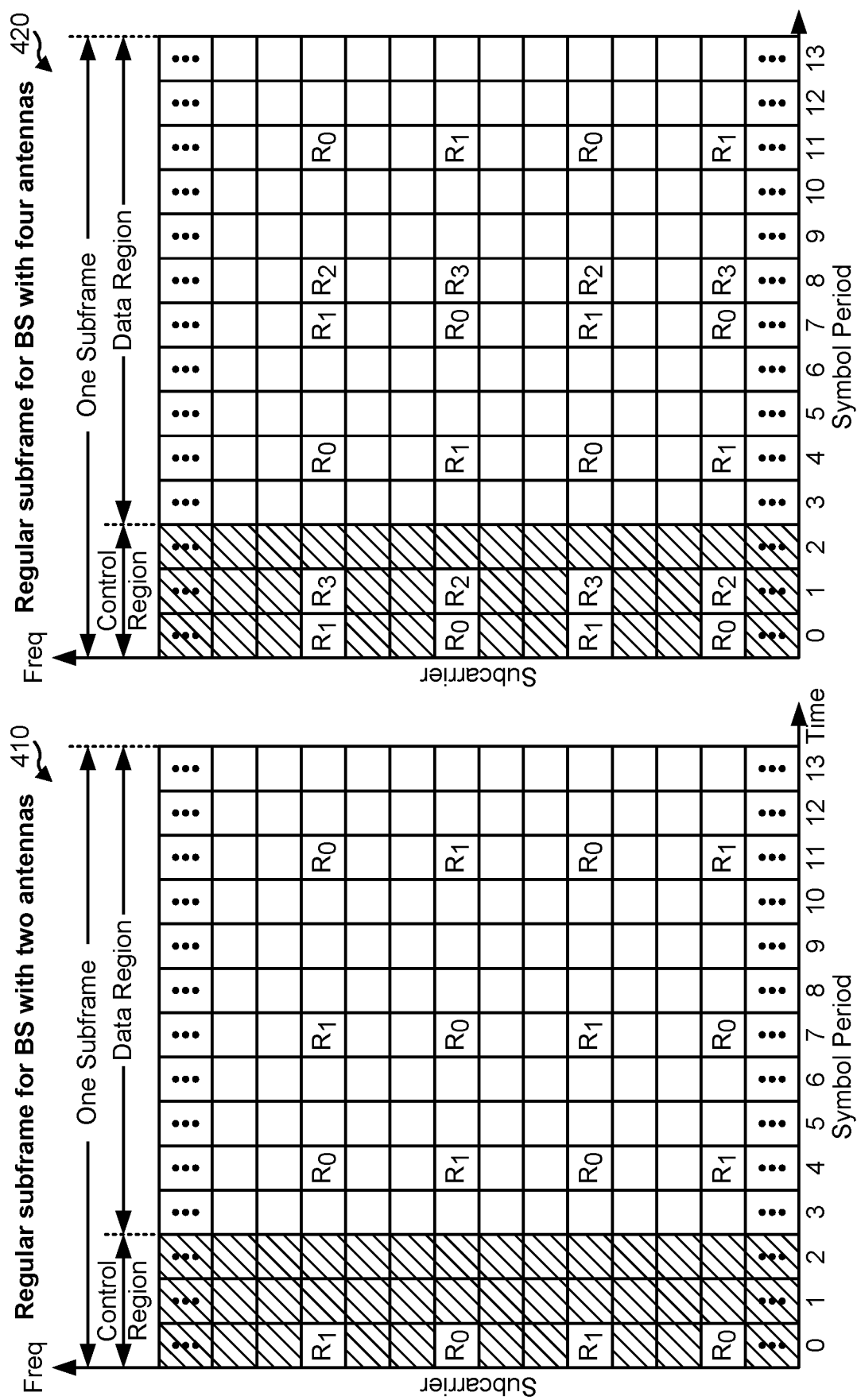
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type. In some cases, the RAN may be associated with a network identifier (e.g., a PLMN identity, a CSG identifier, etc.), which may be used to identify cells via which to connect to the RAN.

As indicated above, FIG. 4 is provided merely as an example. Other examples are possible and may differ from what was described with regard to FIG. 4.

Figure 5:
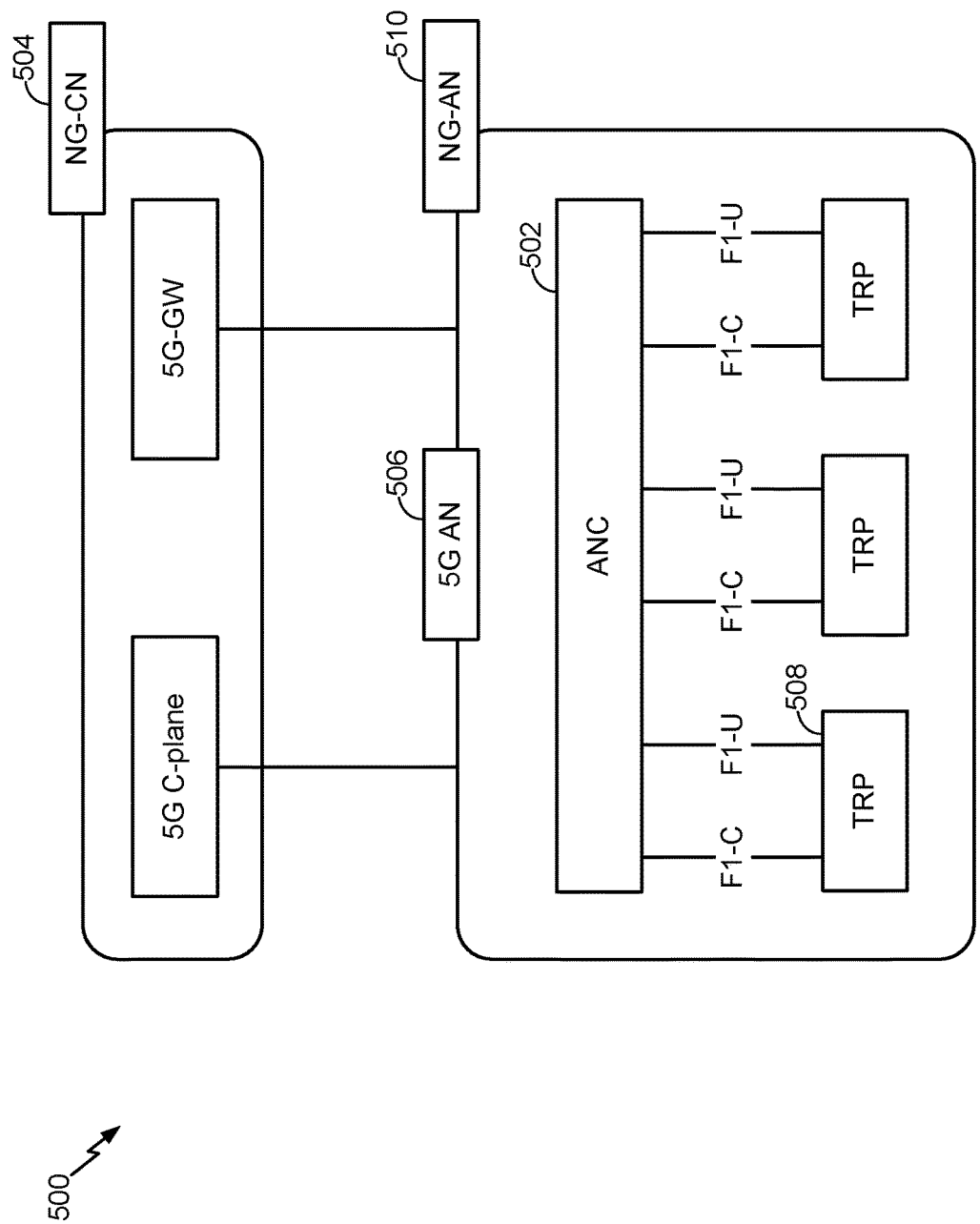
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
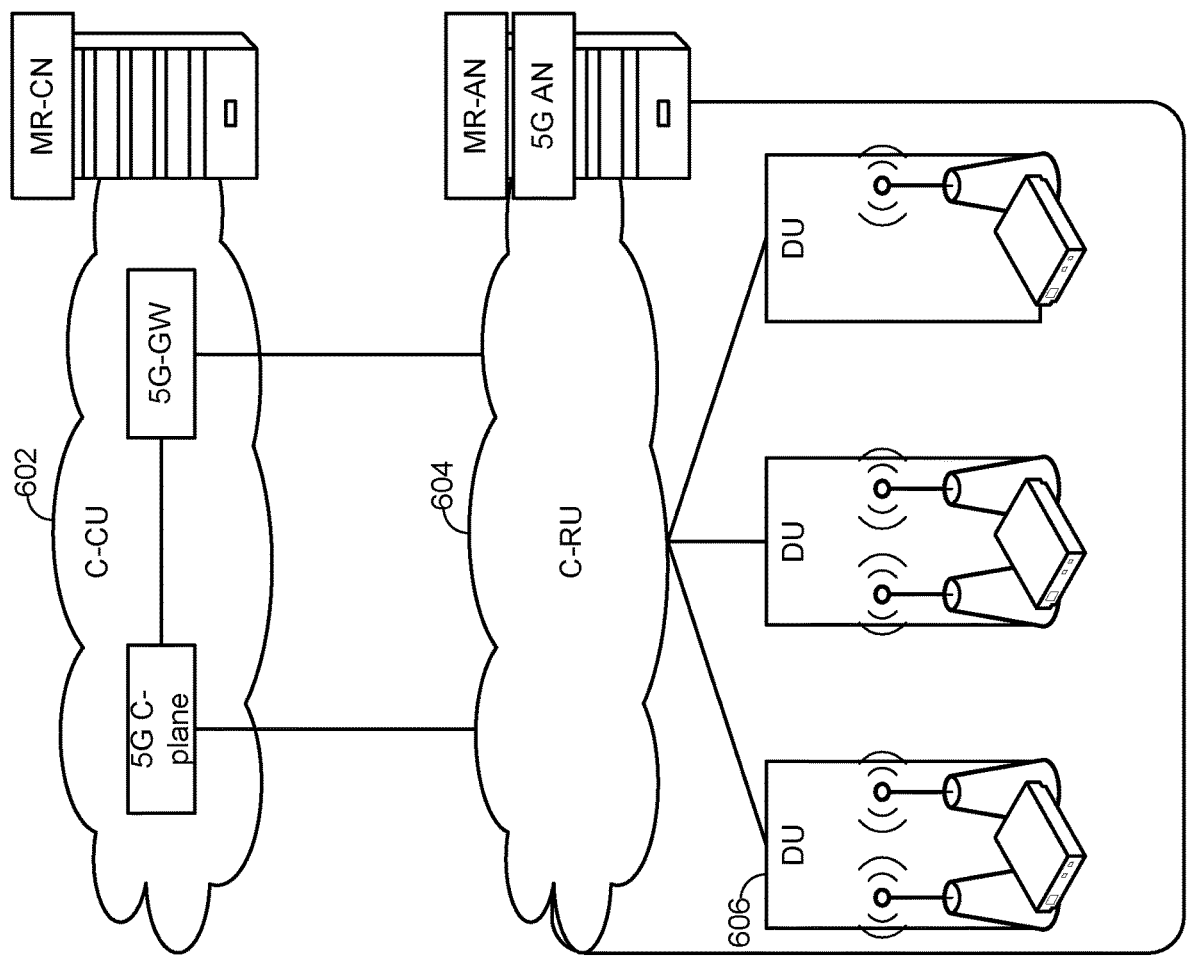
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
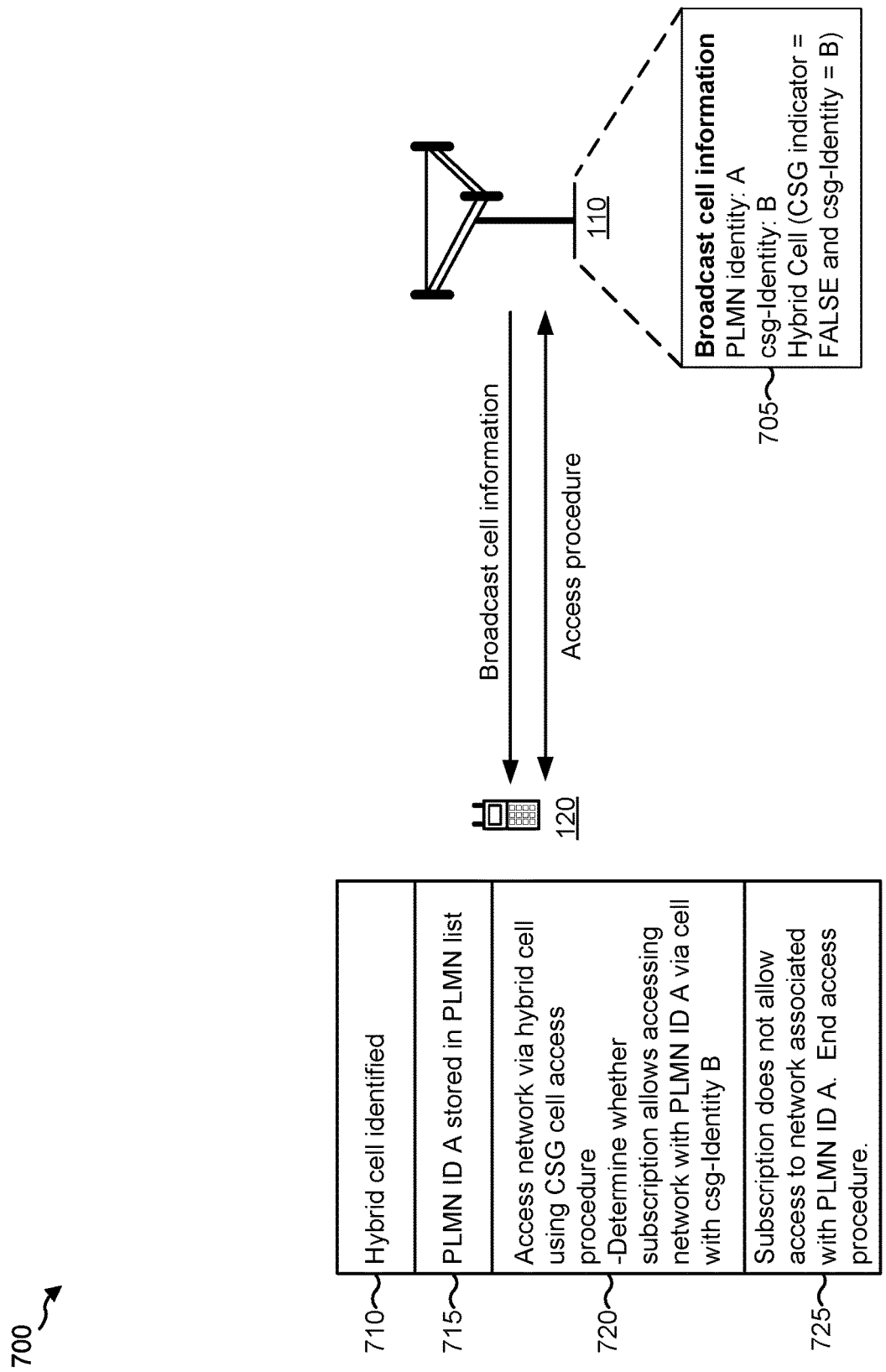
FIG. 7 is a diagram illustrating an example of network access via a hybrid cell associated with a shared PLMN identity, in accordance with various aspects of the present disclosure.

FIG. 7 is a diagram illustrating an example 700 of network access via a hybrid cell associated with a shared PLMN identity, in accordance with various aspects of the present disclosure. FIG. 7 shows a UE 120 and a BS 110. In some instances, the BS 110 provides a cell. For the purpose of FIG. 7, description of the BS 110 is interchangeable with description of the cell provided by BS 110.

As shown in FIG. 7, and by reference number 705, a BS 110 may broadcast cell information associated with the BS 110. As shown, the cell information may identify at least one network identifier of the BS 110. Here, the cell information includes a PLMN identity of A. The PLMN identity of A may be a shared PLMN identity (i.e., the PLMN identity may be associated with multiple, different networks). In some aspects, a cell or BS 110 may be associated with multiple PLMN identities corresponding to multiple networks (e.g., when the cell or BS 110 can provide access to the multiple networks). In such a case, the BS 110 may broadcast the multiple PLMN identities.

As further shown, the cell information includes a CSG identifier (e.g., csg-Identity) of B. The CSG identifier of B may indicate that the BS 110 is associated with a particular CSG, and the UE 120 may store information indicating whether the UE 120 is permitted to access a network via the BS 110 associated with the particular CSG.

As further shown, the BS 110 is configured as a hybrid cell. The BS 110 may advertise that the BS 110 is a hybrid cell by transmitting a CSG indicator set to a false value and by transmitting information identifying the CSG identifier of B. However, in legacy behavior, when a UE identifies the false value of the CSG indicator, the UE may attempt to access a network associated with the BS 110 irrespective of the CSG identifier of the BS 110. This may be because the UE assumes that the BS 110 is not closed based at least in part on the false value of the CSG indicator. Thus, a core network of the BS 110 may be burdened by an unnecessary access procedure performed by the UE that automatically fails if the UE does not have a subscription associated with the CSG identifier of the BS 110.

As shown by reference number 710, the UE 120 may identify the cell provided by the BS 110 as a hybrid cell (e.g., based at least in part on the CSG indicator and the CSG identity of the cell information).

As shown by reference number 715, the UE 120 may determine that the PLMN identity of A (shown as PLMN ID A) is stored in a PLMN list of the UE 120. For example, the PLMN list may identify PLMN identities for which the UE 120 is to perform an access procedure for a CSG cell. Additionally, or alternatively, the PLMN list may identify shared PLMN identities.

In some aspects, the UE 120 may identify the PLMN identity based at least in part on a set of PLMN identities associated with one or more subscriptions of the UE 120. For example, the UE 120 may be configured to access multiple different networks that are associated with respective sets of PLMN identities. The UE 120 may identify a PLMN identity, of the set of PLMN identities, that is transmitted by the BS 110, and may therefore attempt to access a network associated with the PLMN identity via the BS 110.

As shown by reference number 720, the UE 120 may access the network via the hybrid cell using an access procedure for a CSG cell. For example, the UE 120 may use the access procedure for the CSG cell based at least in part on the PLMN identity of A being identified by the PLMN list. The access procedure for the CSG cell may be defined in a wireless communication standard, for example. In some aspects, the access procedure for the CSG cell may include determining whether the CSG identifier of B is identified by a CSG list stored by the UE 120, and whether the PLMN identity of A is associated with a subscription of the UE 120. When the CSG identifier of B is identified by the CSG list and when the PLMN identity of A is associated with the subscription, the UE 120 may access the network via the BS 110. In other words, and as shown, the UE 120 may determine whether a subscription of the UE 120 allows access to the network associated with the PLMN identity of A via a cell with a CSG identifier of B. Thus, unsuccessful connection attempts for hybrid cells are reduced by causing the UE 120 to use an access procedure associated with a CSG cell for the hybrid cell.

In some aspects, the UE 120 may determine that the PLMN identity of A is not identified by the PLMN list (e.g., a PLMN list that includes PLMN identities for which the UE 120 is to perform an access procedure for a CSG cell, a PLMN list that includes shared PLMN identities, and/or the like). In such a case, the UE 120 may perform an access procedure associated with a hybrid cell. For example, the UE 120 may determine that the PLMN identity of A is associated with a subscription of the UE 120, and may therefore perform an access procedure to connect to a network associated with the PLMN identity of A via the BS 110.

In some aspects, when a cell is associated with multiple different PLMN identities, the UE 120 may selectively treat the cell as a hybrid cell or a CSG cell. For example, BS 110 may be associated with a first PLMN identity and a second PLMN identity. Further, the first PLMN identity may be identified by the PLMN list (e.g., a PLMN list that includes PLMN identities for which the UE 120 is to perform an access procedure for a CSG cell, a PLMN list that includes shared PLMN identities, and/or the like), and the second PLMN identity may not be identified by the PLMN list. In such a case, the UE 120 may treat the BS 110 as a hybrid cell with regard to the second PLMN identity, and may treat the BS 110 as a CSG cell with regard to the first PLMN identity.

In some aspects, the UE 120 may be configured with the PLMN list (e.g., as part of onboarding, as part of information stored in a USIM associated with the UE, as part of subscription provisioning as part of provisioning of the UE 120 during manufacture by device vendor, provisioning of the UE 120 after manufacture by a subscription provider using a network device, a subscription management server, or a device management server, and/or the like). Additionally, or alternatively, the UE 120 may generate the PLMN list. For example, the UE 120 may determine when an access procedure fails due to a CSG identifier of a target cell, and may add a PLMN identity of the target cell to the PLMN list. Additionally, or alternatively, the UE 120 may receive PLMN identities from one or more BSs 110 and may generate the PLMN list from the received PLMN identities.

As shown by reference number 725, the UE 120 may determine that the subscription of the UE 120 does not allow access to the network associated with the PLMN identity of A (e.g., an EPC connected to BS 110 identified by the PLMN identity A) via a cell with a CSG identifier of B even though the cell is configured as a hybrid cell. Therefore, the UE 120 may not access the network via BS 110 (e.g., may end an access procedure for the BS 110). In this way, efficiency of the access procedure is improved and load on the core network is reduced by reducing a quantity of erroneously initiated access procedures.

Thus, the UE 120 may store a PLMN list that includes shared PLMN identifiers of PLMNs for which a particular type of access procedure (e.g., a CSG access procedure) is to be performed. If a PLMN identifier broadcast by the BS 110 for a hybrid cell matches a shared PLMN identifier in the PLMN list, then the UE 120 may perform a CSG access procedure to attempt to access the hybrid cell. When performing the CSG access procedure, if the UE 120 has a subscription to the PLMN identified by the PLMN identifier (e.g., as determined by looking up PLMN subscription information stored by the UE 120), and if the UE 120 stores a CSG identifier that matches a CSG identifier broadcast by the BS 110 for the hybrid cell, then the UE 120 may request a connection to the hybrid cell. However, if the UE 120 does not have a subscription to the PLMN, or if the broadcast CSG identifier does not match a CSG identifier stored by the UE 120, then the UE 120 may determine not to request a connection to the hybrid cell. In this way, unnecessary connection attempts to the hybrid cell may be prevented.

On the other hand, if a PLMN identifier broadcast by the BS 110 for a hybrid cell does not match a shared PLMN identifier in the PLMN list, then the UE 120 may perform a hybrid access procedure to attempt to access the hybrid cell. When performing the hybrid access procedure, the UE 120 may determine not to check a CSG list stored by the UE 120. Thus, if the UE 120 has a subscription to the PLMN identified by the PLMN identifier, then the UE 120 may request a connection to the hybrid cell. However, if the UE 120 does not have a subscription to the PLMN, then the UE 120 may determine not to request a connection to the hybrid cell.

As indicated above, FIG. 7 is provided as an example. Other examples are possible and may differ from what was described with respect to FIG. 7.

Figure 8:
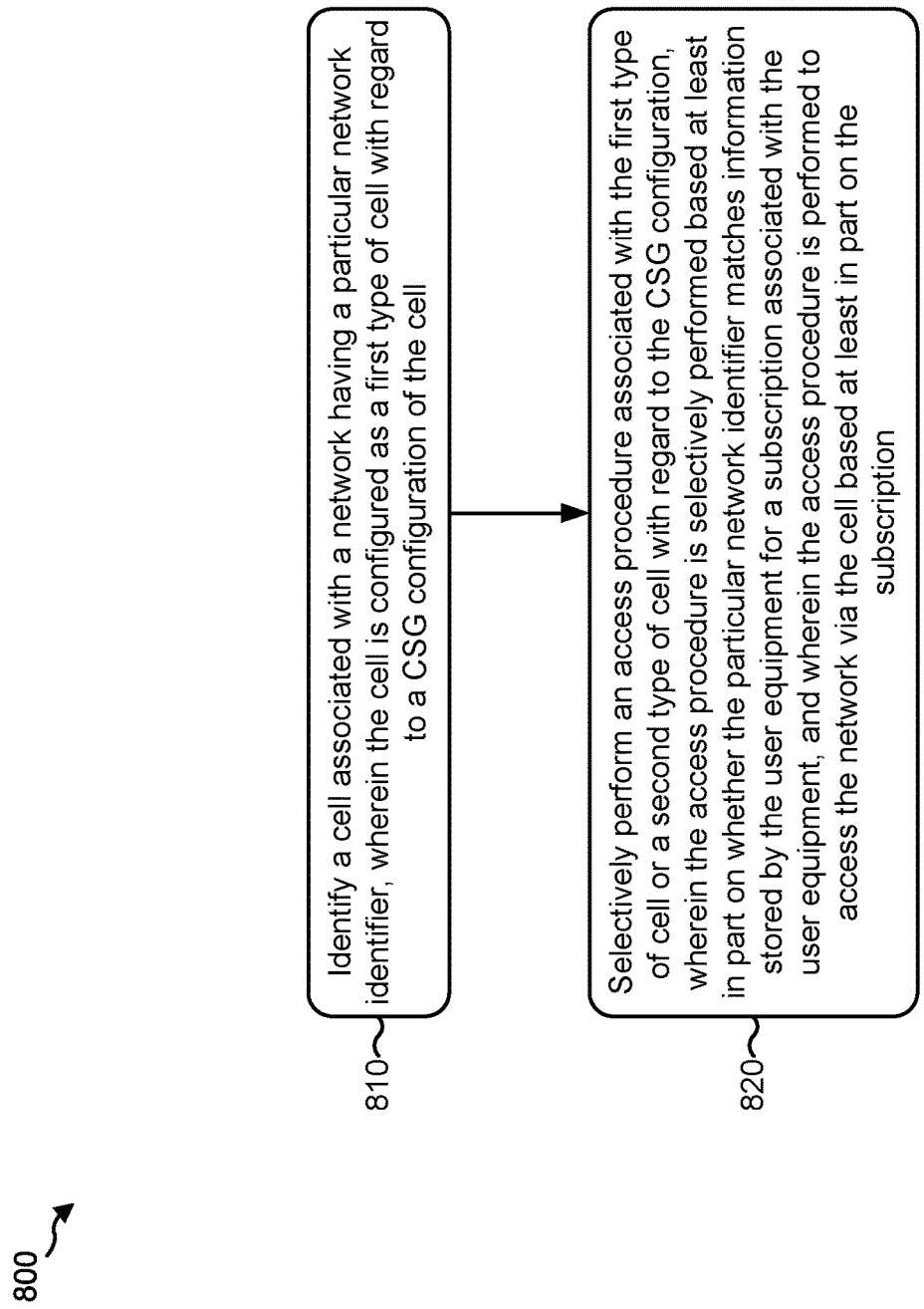
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs network access via a hybrid cell associated with a shared PLMN identity.

As shown in FIG. 8, in some aspects, process 800 may include identifying a cell associated with a network having a particular network identifier, wherein the cell is configured as a first type of cell with regard to a CSG configuration of the cell (block 810). For example, the UE may identify a cell (e.g., provided by a BS 110) associated with a network having a particular network identifier. The cell may be configured as a first type of cell (e.g., a hybrid cell) with regard to a CSG configuration of the cell. In some aspects, the UE 120 may identify the cell based at least in part on the cell being configured as a hybrid cell based at least in part on a SIB1 block of the cell.

As shown in FIG. 8, in some aspects, process 800 may include selectively performing an access procedure associated with the first type of cell or a second type of cell with regard to the CSG configuration, wherein the access procedure is selectively performed based at least in part on whether the particular network identifier matches information stored by the user equipment for a subscription associated with the user equipment, wherein the access procedure is performed to access the network via the cell based at least in part on the subscription (block 820). For example, the UE may selectively perform an access procedure associated with the first type of cell (e.g., a hybrid cell) or a second type of cell (e.g., a CSG cell) based at least in part on whether the particular network identifier matches information stored by the UE for a subscription associated with the UE. In some aspects, the access procedure may be performed to access the network via the cell based at least in part on the subscription. In some aspects, when the particular network identifier matches the information, the UE may perform an access procedure associated with the second type of cell (e.g., the CSG cell) to access the network with the particular network identifier. In some aspects, when the particular network identifier does not match the information, the UE may perform an access procedure associated with the first type of cell (e.g., the hybrid cell) to access the network with the particular network identifier.

In some aspects, the first type of cell is a hybrid cell with regard to the CSG configuration and the second type of cell is a closed cell with regard to the CSG configuration. In some aspects, performing the access procedure associated with the second type of cell comprises determining whether the subscription allows accessing networks having the particular network identifier via a cell with a CSG identifier equal to a CSG identifier of the cell.

In some aspects, performing the access procedure further comprises checking whether a CSG list, stored by the user equipment, indicates that the CSG identifier is included in the CSG list and is associated with the particular network identifier. In some aspects, the particular network identifier is a public land mobile network (PLMN) identity. In some aspects, the information stored by the user equipment includes a list of public land mobile network identities, and a network identifier matches the information based at least in part on whether the network identifier is included in the list.

In some aspects, performing the access procedure associated with the first type of cell comprises determining whether accessing a network with the particular network identifier is allowed by the subscription. In some aspects, the information stored by the user equipment includes a list of network identifiers. In such a case, a network identifier matches the information based at least in part on whether the network identifier is included in the list of network identifiers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
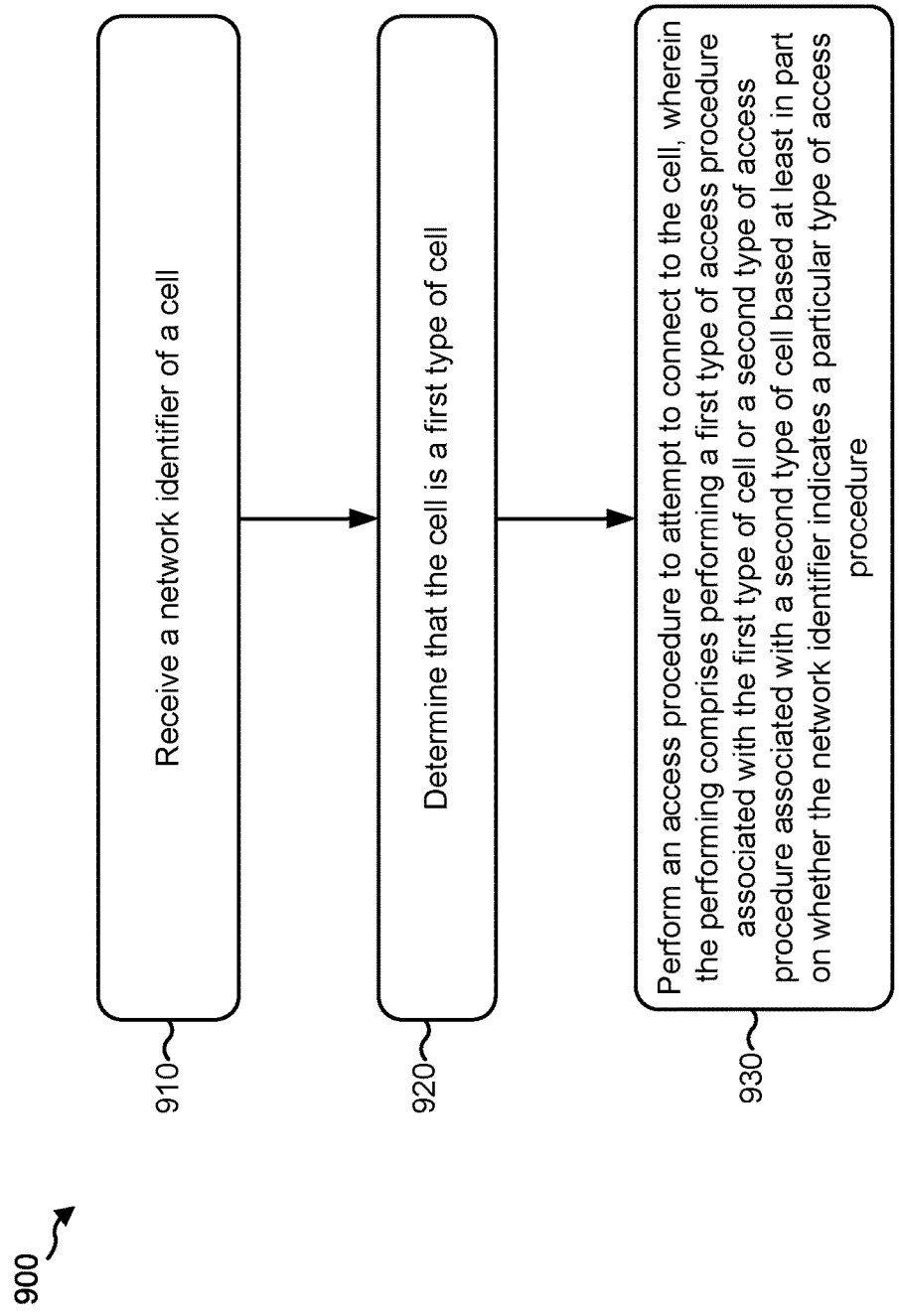
FIG. 9 is a diagram illustrating another example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs network access via a hybrid cell associated with a shared PLMN identity.

As shown in FIG. 9, in some aspects, process 900 may include receiving a network identifier of a cell (block 910). For example, the UE (e.g., using antenna 252, DEMOD 254, MIMO detector 256, receive processor 258, controller/processor 280, and/or the like) may receive a network identifier of a cell, as described above in connection with FIG. 7.

As further shown in FIG. 9, in some aspects, process 900 may include determining that the cell is a first type of cell (block 920). For example, the UE (e.g., using controller/processor 280 and/or the like) may determine that the cell is a first type of cell, as described above in connection with FIG. 7.

As further shown in FIG. 9, in some aspects, process 900 may include performing an access procedure to attempt to connect to the cell, wherein the performing comprises performing a first type of access procedure associated with the first type of cell or a second type of access procedure associated with a second type of cell based at least in part on whether the network identifier indicates a particular type of access procedure (block 930). For example, the UE (e.g., using controller/processor 280 and/or the like) may perform an access procedure to attempt to connect to the cell, as described above in connection with FIG. 7. In some aspects, a first type of access procedure associated with the first type of cell or a second type of access procedure associated with a second type of cell is performed based at least in part on whether the network identifier indicates a particular type of access procedure.

Process 900 may include one or more additional aspects, such as one or more aspects described below and/or in combination with one or more other processes described herein.

In some aspects, the UE may determine whether the network identifier indicates the particular type of access procedure based at least in part on whether the network identifier matches information stored by the UE. In some aspects, the network identifier is a public land mobile network (PLMN) identity, and wherein the information stored by the UE includes a list of shared PLMN identities for which the second type of access procedure is to be performed. In some aspects, the first type of cell is a hybrid cell with regard to a closed subscriber group (CSG) configuration and the second type of cell is a closed cell with regard to the CSG configuration.

In some aspects, performing the first type of access procedure comprises determining whether the UE has a subscription for a network identified by the network identifier, and wherein performing the first type of access procedure does not include determining whether the UE stores a closed subscriber group (CSG) identifier for the cell. In some aspects, performing the first type of access procedure comprises requesting a connection to the cell based at least in part on a determination that the UE has a subscription for a network identified by the network identifier. In some aspects, performing the first type of access procedure comprises preventing a connection request for the cell based at least in part on a determination that the UE does not have a subscription for a network identified by the network identifier.

In some aspects, performing the second type of access procedure comprises determining whether the UE has a subscription for a network identified by the network identifier and determining whether the UE stores a closed subscriber group (CSG) identifier for the cell. In some aspects, performing the second type of access procedure comprises requesting a connection to the cell based at least in part on a determination that the UE has a subscription for a network identified by the network identifier and that the UE stores a closed subscriber group (CSG) identifier for the cell. In some aspects, performing the second type of access procedure comprises preventing a connection request for the cell based at least in part on a determination that the UE does not have a subscription for a network identified by the network identifier or that the UE does not store a closed subscriber group (CSG) identifier for the cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving a network identifier of a cell;
determining that the cell is a first type of cell; and
performing an access procedure to attempt to connect to the cell, wherein performing the access procedure comprises performing a first type of access procedure associated with the first type of cell or a second type of access procedure associated with a second type of cell based at least in part on whether the network identifier indicates a particular type of access procedure, wherein performing the first type of access procedure comprises determining whether the UE has a subscription for a network identified by the network identifier, and wherein performing the first type of access procedure does not include determining whether the UE stores a closed subscriber group (CSG) identifier for the cell.

2. The method of claim 1, further comprising determining whether the network identifier indicates the particular type of access procedure based at least in part on whether the network identifier matches information stored by the UE.

3. The method of claim 2, wherein the network identifier is a public land mobile network (PLMN) identity, and wherein the information stored by the UE includes a list of shared PLMN identities for which the second type of access procedure is to be performed.

4. The method of claim 1, wherein the first type of cell is a hybrid cell with regard to a CSG configuration and the second type of cell is a closed cell with regard to the CSG configuration.

5. The method of claim 1, wherein performing the first type of access procedure further comprises requesting a connection to the cell based at least in part on a determination that the UE has the subscription for the network identified by the network identifier.

6. The method of claim 1, wherein performing the first type of access procedure further comprises preventing a connection request for the cell based at least in part on a determination that the UE does not have the subscription for the network identified by the network identifier.

7. The method of claim 1, wherein performing the second type of access procedure comprises determining whether the UE has the subscription for the network identified by the network identifier and determining whether the UE stores the CSG identifier for the cell.

8. The method of claim 1, wherein performing the second type of access procedure comprises requesting a connection to the cell based at least in part on a determination that the UE has the subscription for the network identified by the network identifier and that the UE stores the CSG identifier for the cell.

9. The method of claim 1, wherein performing the second type of access procedure comprises preventing a connection request for the cell based at least in part on a determination that the UE does not have the subscription for the network identified by the network identifier or that the UE does not store the CSG identifier for the cell.

10. A user equipment (UE) for wireless communication, comprising:
a memory; and
one or more processors operatively coupled to the memory, the memory and the one or more processors configured to:
receive a network identifier of a cell;
determine that the cell is a first type of cell; and
perform an access procedure to attempt to connect to the cell, wherein performing the access procedure comprises performing a first type of access procedure associated with the first type of cell or a second type of access procedure associated with a second type of cell based at least in part on whether the network identifier indicates a particular type of access procedure, wherein performing the first type of access procedure comprises determining whether the UE has a subscription for a network identified by the network identifier, and wherein performing the first type of access procedure does not include determining whether the UE stores a closed subscriber group (CSG) identifier for the cell.

11. The UE of claim 10, wherein the one or more processors are configured to determine whether the network identifier indicates the particular type of access procedure based at least in part on whether the network identifier matches information stored by the UE.

12. The UE of claim 11, wherein the network identifier is a public land mobile network (PLMN) identity, and wherein the information stored by the UE includes a list of shared PLMN identities for which the second type of access procedure is to be performed.

13. The UE of claim 10, wherein the first type of cell is a hybrid cell with regard to a CSG configuration and the second type of cell is a closed cell with regard to the CSG configuration.

14. The UE of claim 10, wherein performing the first type of access procedure further comprises requesting a connection to the cell based at least in part on a determination that the UE has the subscription for the network identified by the network identifier.

15. The UE of claim 10, wherein performing the first type of access procedure further comprises preventing a connection request for the cell based at least in part on a determination that the UE does not have the subscription for the network identified by the network identifier.

16. The UE of claim 10, wherein performing the second type of access procedure comprises determining whether the UE has the subscription for the network identified by the network identifier and determining whether the UE stores the CSG identifier for the cell.

17. The UE of claim 10, wherein performing the second type of access procedure comprises requesting a connection to the cell based at least in part on a determination that the UE has the subscription for the network identified by the network identifier and that the UE stores the CSG identifier for the cell.

18. The UE of claim 10, wherein performing the second type of access procedure comprises preventing a connection request for the cell based at least in part on a determination that the UE does not have the subscription for the network identified by the network identifier or that the UE does not store the CSG identifier for the cell.

19. A non-transitory computer-readable medium storing one or more instructions for wireless communication, the one or more instructions comprising:
one or more instructions that, when executed by one or more processors of a user equipment (UE), cause the one or more processors to:
receive a network identifier of a cell;
determine that the cell is a first type of cell; and
perform an access procedure to attempt to connect to the cell, wherein a first type of access procedure associated with the first type of cell or a second type of access procedure associated with a second type of cell is performed based at least in part on whether the network identifier indicates a particular type of access procedure, wherein performing the first type of access procedure comprises determining whether the UE has a subscription for a network identified by the network identifier, and wherein performing the first type of access procedure does not include determining whether the UE stores a closed subscriber group (CSG) identifier for the cell.

20. The non-transitory computer-readable medium of claim 19, wherein the one or more instructions further cause the one or more processors to determine whether the network identifier indicates the particular type of access procedure based at least in part on whether the network identifier matches information stored by the UE.

21. The non-transitory computer-readable medium of claim 19, wherein performing the second type of access procedure comprises determining whether the UE has the subscription for the network identified by the network identifier and determining whether the UE stores the CSG identifier for the cell.

22. The non-transitory computer-readable medium of claim 19, wherein performing the second type of access procedure comprises requesting a connection to the cell based at least in part on a determination that the UE has the subscription for the network identified by the network identifier and that the UE stores the CSG identifier for the cell.

23. The non-transitory computer-readable medium of claim 19, wherein performing the second type of access procedure comprises preventing a connection request for the cell based at least in part on a determination that the UE does not have the subscription for the network identified by the network identifier or that the UE does not store the CSG identifier for the cell.

24. An apparatus for wireless communication, comprising:
means for receiving a network identifier of a cell;
means for determining that the cell is a first type of cell; and
means for performing an access procedure to attempt to connect to the cell, wherein a first type of access procedure associated with the first type of cell or a second type of access procedure associated with a second type of cell is performed based at least in part on whether the network identifier indicates a particular type of access procedure, wherein means for performing the first type of access procedure comprises means for determining whether the apparatus has a subscription for a network identified by the network identifier, and wherein the means for performing the first type of access procedure does not include means for determining whether the apparatus stores a closed subscriber group (CSG) identifier for the cell.

25. The apparatus of claim 24, further comprising means for determining whether the network identifier indicates the particular type of access procedure based at least in part on whether the network identifier matches information stored by the apparatus.

26. The apparatus of claim 25, wherein the network identifier is a public land mobile network (PLMN) identity, and wherein the information stored by the apparatus includes a list of shared PLMN identities for which the second type of access procedure is to be performed.

27. The apparatus of claim 24, wherein means for performing the second type of access procedure comprises means for determining whether the apparatus has the subscription for the network identified by the network identifier and means for determining whether the apparatus stores the CSG identifier for the cell.

28. The apparatus of claim 24, wherein the first type of cell is a hybrid cell with regard to a CSG configuration and the second type of cell is a closed cell with regard to the CSG configuration.

29. The apparatus of claim 24, wherein the means for performing the first type of access procedure further comprises means for requesting a connection to the cell based at least in part on a determination that the apparatus has the subscription for the network identified by the network identifier.

30. The apparatus of claim 24, wherein the means for performing the first type of access procedure further comprises means for preventing a connection request for the cell based at least in part on a determination that the apparatus does not have the subscription for the network identified by the network identifier.

* * * * *